US009909640B2

(12) United States Patent
Cerniway et al.

(10) Patent No.: US 9,909,640 B2
(45) Date of Patent: Mar. 6, 2018

(54) APPARATUS AND METHOD FOR VIBRATION MITIGATION THROUGH SEQUENTIAL IMPEDANCE OPTIMIZATION

(71) Applicant: Sercel, Inc., Houston, TX (US)

(72) Inventors: Matthew Cerniway, Katy, TX (US); Michael Maples, Houston, TX (US); Gaetan Mellier, Houston, TX (US)

(73) Assignee: SERCEL, INC., Houston, TX (US)

( * ) Notice: Subject to any disclaimer, the term of this patent is extended or adjusted under 35 U.S.C. 154(b) by 481 days.

(21) Appl. No.: 14/509,137

(22) Filed: Oct. 8, 2014

(65) Prior Publication Data

US 2016/0102729 A1     Apr. 14, 2016

(51) Int. Cl.
| | | |
|---|---|---|
| G01V 1/20 | (2006.01) | |
| B63B 21/56 | (2006.01) | |
| F16F 15/02 | (2006.01) | |

(52) U.S. Cl.
CPC ............ *F16F 15/022* (2013.01); *G01V 1/201* (2013.01); *B63B 21/56* (2013.01); *G01V 2001/205* (2013.01)

(58) Field of Classification Search
CPC ... G01V 1/201; G01V 2001/205; B63B 21/56
USPC .......................................... 367/20; 174/101.5
See application file for complete search history.

(56) References Cited

U.S. PATENT DOCUMENTS

| | | | | |
|---|---|---|---|---|
| 3,930,254 A | * | 12/1975 | Pavey, Jr. | ............... G01V 1/201 174/101.5 |
| 4,090,168 A | * | 5/1978 | Miller | ...................... B63G 8/42 174/101.5 |
| 4,628,851 A | * | 12/1986 | Appling | ................. G01V 1/201 114/253 |
| 4,660,183 A | * | 4/1987 | McGowan | ............. G01V 1/201 367/130 |
| 4,689,774 A | * | 8/1987 | Cameron | ................ G01V 1/201 174/101.5 |
| 5,062,085 A | * | 10/1991 | Andrews, Jr. | ........... B63B 21/56 174/101.5 |
| 5,471,436 A | * | 11/1995 | Harvey | .................. G01V 1/201 174/101.5 |
| 5,641,248 A | | 6/1997 | Arlt, III | |

(Continued)

FOREIGN PATENT DOCUMENTS

EP       0171936 A2     2/1986

OTHER PUBLICATIONS

European Search Report in corresponding European Application No. EP 15 18 8475 dated May 9, 2016.

(Continued)

*Primary Examiner* — Ian J Lobo
(74) *Attorney, Agent, or Firm* — Patent Portfolio Builders PLLC

(57) ABSTRACT

Method and apparatus for mitigating vibrations in a device towed in water. The apparatus includes one or more tuned elastic sections having a complex spring rate and adapted to attenuate vibrations in a specified frequency range; and a head end coupler adapted to couple the apparatus for vibration mitigation to a component of an electro-mechanical cable or a tow assembly. One of the one or more tuned elastic sections is coupled to the head end coupler with a high impedance material interface.

19 Claims, 5 Drawing Sheets

(56) References Cited

U.S. PATENT DOCUMENTS

| | | | |
|---|---|---|---|
| 7,184,366 B1* | 2/2007 | Harrick | G01V 1/3808 367/20 |
| 9,057,798 B2* | 6/2015 | Juhasz | G01V 1/201 |
| 2004/0013036 A1 | 6/2004 | Fageras et al. | |
| 2013/0114374 A1 | 5/2013 | Juhasz et al. | |

OTHER PUBLICATIONS

Office Action received in corresponding European Patent Application No. 15188475.6-1559, dated May 26, 2017.
Office Action dated Jan. 2, 2018 in related EP application No. 15 188 475.6-1559.

\* cited by examiner

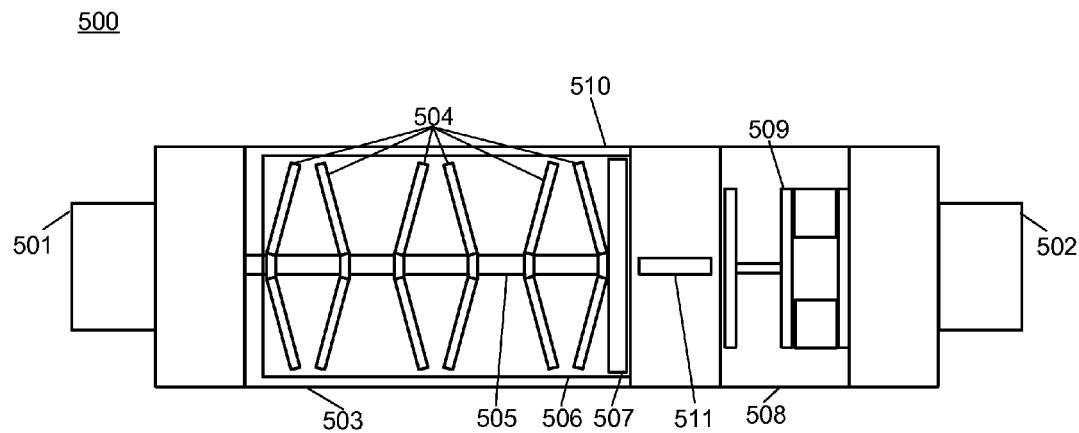
FIG. 5
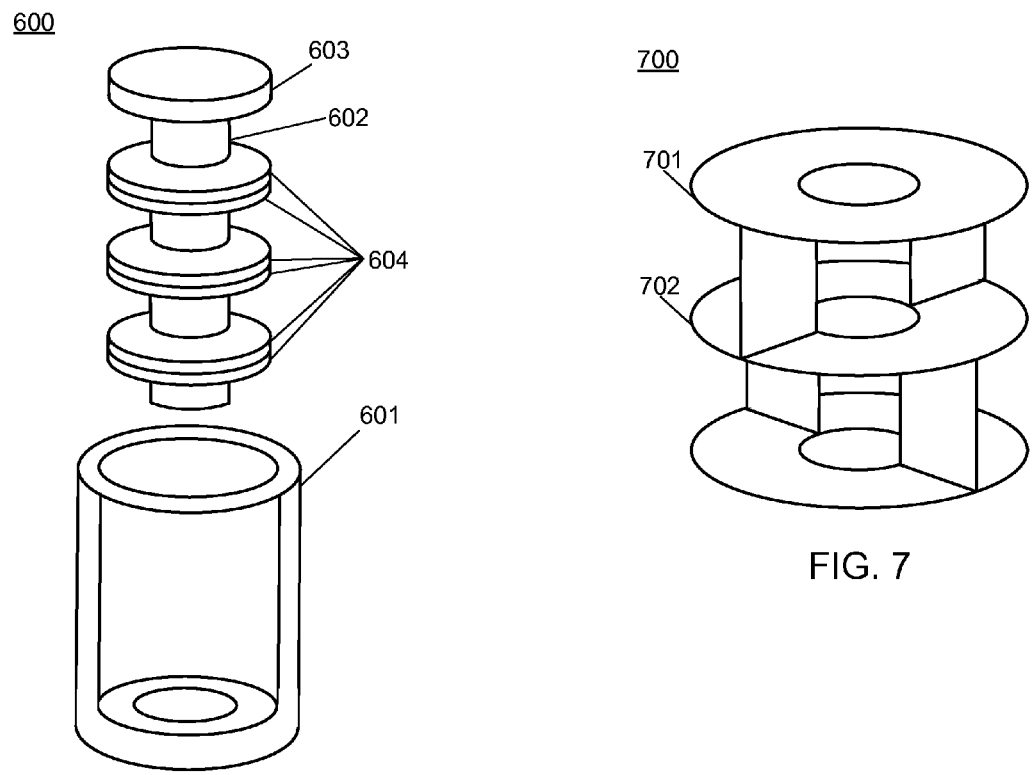
FIG. 6
FIG. 7

APPARATUS AND METHOD FOR VIBRATION MITIGATION THROUGH SEQUENTIAL IMPEDANCE OPTIMIZATION

BACKGROUND

Technical Field

Embodiments of the subject matter disclosed herein generally relate to an apparatus and method for vibration mitigation through sequential impedance optimization.

Discussion of the Background

An electro-mechanical cable may be a cable, such as, for example, a marine-seismic cable, including sensor components, data-transmission cables, power-transmission cables and strength enhancing and buoyancy enhancing components arranged in a single cable. A marine-seismic cable may be an electro-mechanical cable used for gathering data on the nature and composition of the earth below a body of water using seismic imaging techniques. The marine-seismic cable, or seismic streamer, may be designed to reduce hydrodynamic induced flow noise. For example, the marine seismic cable may be cylindrical.

FIG. 1 depicts an exemplary marine-seismic cable system in use. A marine vessel 101, including a lead-in towing assembly 102, may deploy and tow electro-mechanical cables 103, on or below the surface of the water. The electro-mechanical cables 103 may be of any suitable length, and may be made up of shorter connected sections 106 of electro-mechanical cabling which may also be of any suitable length. For example, an electro-mechanical cable 103 may be kilometers in length, with each section 106 being, for example, 75 meters to 200 meters in length. Sections 106 may be detachable from each other. The electro-mechanical cable 103 may be, for example, a marine-seismic cable or seismic streamer. Seismic-imaging systems may make use of more than one electro-mechanical cable 103. The electro-mechanical cables 103 may be deployed as a single section 106, a linear series of sections 106, or as a horizontal offset series of sections 106, producing a sensor field.

Sections 106 of the electro-mechanical cables 103 may include various sensor components 104. Sensor components 104 may be, for example, hydrophones, geophones, accelerometers, electro-magnetic sensors, optical sensors, gravity sensors, or a combination thereof and may be distributed at regular intervals along the electro-mechanical cables 103. An outer jacket around the electro-mechanical cable 103 may be, for example, a polyurethane jacket, and may be smooth in order minimize noise in the sensor components 104. A buoyant material may be contained in the electro-mechanical cable 103, and may help keep the electro-mechanical cable 103 level on top of or under the water.

A seismic source 108 may be used to produce a shockwave, using any suitable manner of generating acoustic energy. The seismic source may include one or more air guns or vibratory elements. When conducting an acoustic survey, the shockwave may be reflected by the geologic features of the sea floor and picked up by the sensor components 104. Vibrations emanating from the head of the streamer field (or streamer spread) 110, near the marine vessel 101, may contaminate the seismic signals measured by the sensor components 104. Radial vibration isolation modules 109 may be placed between the towing assembly 102 and the electro-mechanical cables 103, at the head of the streamer field 110, in order to mitigate the transmission of vibration noise. There are several types of radial vibration isolation modules 109 that may be used in electro-mechanical cables 103 at the head of the streamer field 110. Each of the available types of radial vibration isolation modules 109 may include a single stretch section with vibration attenuation that occurs due to a complex spring rate of the radial vibration isolation module 109. Radial vibration isolation modules 109 may be tailored to attenuate vibration over the frequency bandwidth of 2 to 250 Hz, which may be common in seismic acquisition.

The electro-mechanical cables 103 may each include one or more positioning devices, also known as birds 107. Birds 107 may include control surfaces that may be used to position the electro-mechanical cables 103. For example, the birds 107 may be used to maintain the electro-mechanical cables 103, to which they are attached, in a known and controllable position relative to other electro-mechanical cables 103. The birds 107 are capable of moving the electro-mechanical cables 103. The electro-mechanical cables may also include attached recovery nodes, which may be devices clamped to the outsides of the electro-mechanical cables 103 that may include sensors (pressure sensors) that monitor for when the electro-mechanical cables 103 pass a given depth. The recovery nodes may include an inflatable portion that may inflate if an electro-mechanical cable 103 has sunk too far into the water, causing the electro-mechanical cable 103 to float back to the surface where it can be retrieved.

Because the electro-mechanical cables 103 are deployed in a viscous fluid, for example, water, the electro-mechanical cables 103 are subject to energy sources from both man-made sources, such as energy transmitted through the tow assembly 102, or energy from the propulsion system of the marine vessel 101, and natural sources, such as wave motion and weather. The energy from these sources may diminish the quality of the seismic data recorded by the sensor components 104, as they may interfere with the signal from the acoustic energy reflected off the sea floor. Thus, the signal measured by the sensor components 104 of an electro-mechanical cable 103 may be divided into two parts, the "signal" pertaining to the geophysical structure of the sea floor, and "noise," which may be picked up from other man-made or natural sources. The signal is desired while the noise contaminates the signal.

Existing noise suppression hardware, such as the radial vibration isolation modules 109, which are concentrated at the head of the streamer field 110, between the towing assembly 102 and the electro-mechanical cables 103, may not provide a sufficient level of noise abatement because devices that operate over such a wide frequency bandwidth, e.g., 2-250 Hz, are typically a result of compromise, sacrificing performance in one frequency region to handle another. The "noise" experienced by electro-mechanical cables 103 may be both spatially dependent, varying depending on the position within the streamer field 110, and frequency dependent. Thus, there is a need for an apparatus and method for vibration mitigation that overcomes the problems mentioned above.

SUMMARY

In various embodiments, an apparatus and method are provided for vibration mitigation through sequential impedance optimization. The apparatus for vibration mitigation includes one or more tuned elastic sections having a complex spring rate and adapted to attenuate vibrations in a specified frequency range; and a head end coupler adapted to couple the apparatus for vibration mitigation to a component of an electro-mechanical cable or a tow assembly.

One of the one or more tuned elastic sections is coupled to the head end coupler with a high impedance material interface.

In another embodiment, there is a streamer spread for conducting a seismic survey that includes a section comprising at least one sensor component for collecting seismic data; and a vibration mitigation assembly adapted to attenuate vibrations experienced by the section, wherein the vibration mitigation assembly is coupled to the section. The vibration mitigation assembly is positioned next to the section based on calculations performed prior to collecting the seismic data.

In still another embodiment, there is a method for preparing a vibration mitigation assembly. The method includes determining forces experienced at a selected location of an electro-mechanical cable; determining frequencies of vibrations caused by the forces at the selected location of the electro-mechanical cable; selecting one or more tuned elastic sections based on the determined frequencies; joining the one or more selected tuned elastic sections using at least one high impedance material interface to form a vibration mitigation assembly; and placing the vibration mitigation assembly at the selected location along the electro-mechanical cable.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 5 depicts an exemplary cable dynamics isolator;

FIG. 6 depicts an exemplary portion of a cable dynamics isolator including a chamber, a rod, and disk springs;

FIG. 7 depicts an exemplary multi-axis flexure; and

DETAILED DESCRIPTION

Figure 1:
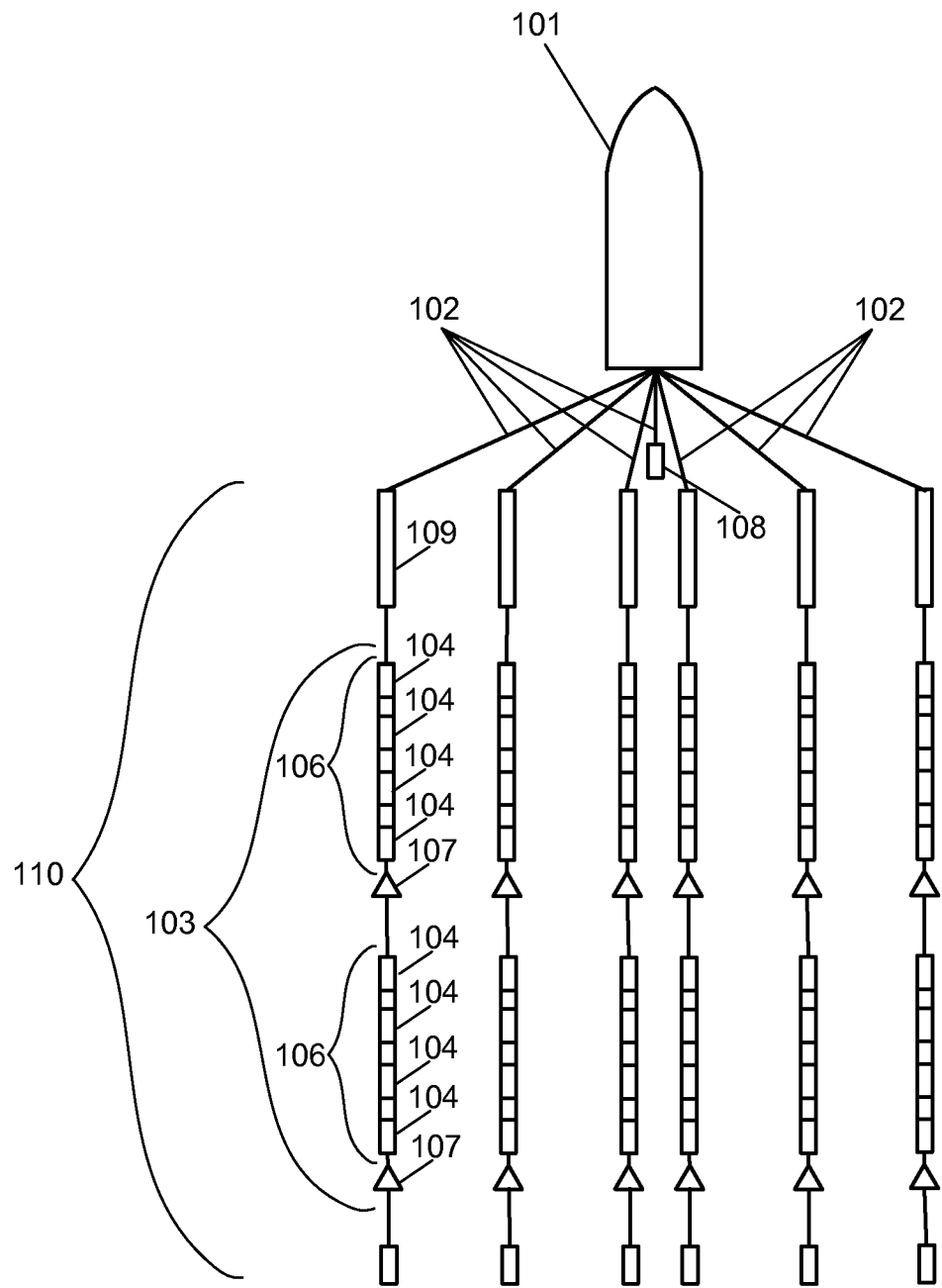
FIG. 1 depicts an exemplary marine-seismic cable system in use.

The following description of the exemplary embodiments refers to the accompanying drawings. The same reference numbers in different drawings identify the same or similar elements. The following detailed description does not limit the invention. Instead, the scope of the invention is defined by the appended claims. In various embodiments as illustrated in the figures, a vibration mitigation assembly is included in an electro-mechanical cable for vibration mitigation through sequential impedance optimization.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As discussed above, existing noise suppression hardware, such as the radial vibration isolation modules 109, are concentrated at the head of the streamer field 110, between the towing assembly 102 and the electro-mechanical cables 103. This placement may be based on an assumption that the primary source of cable borne vibration precedes the head of the streamer field 110, and that transverse and axial motion within the electro-mechanical cables 103 derives from axial motion of the electro-mechanical cables 103. However, it was observed that noise generated in front of the head of the streamer field 110 may decay rapidly, and noise picked up by the sensor components 104 of the electro-mechanical cables 103 may originate with the birds 107, as well as with the recovery nodes or other existing equipment (called herein nodes for simplicity) that are attached to the electro-mechanical cables 103. It has also been observed that the birds 107, the recovery nodes or other nodes may introduce noise along all axes of movement of the electro-mechanical cables 103, including the x, y, z, and rotational axes. Furthermore, it was observed that the frequency range of the noise at a frontal location of the electro-mechanical cable may be different than at a distal location. Thus, a new device is necessary for removing the noise at any location along the cable and also the structure and position of the new or existing devices needs to be adapted to the characteristics of the cable and the frequency range of the noise at that location along the cable.

Figure 2:
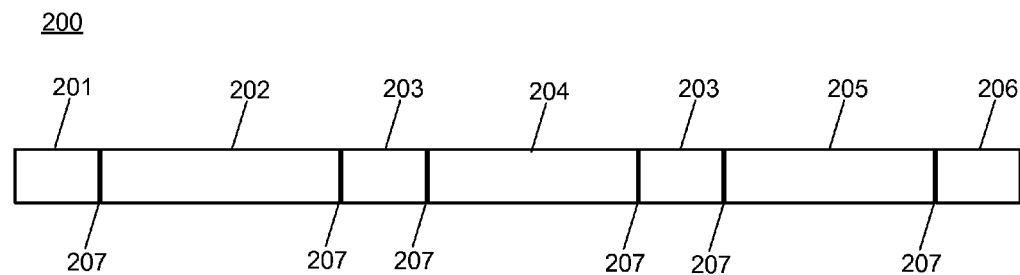
FIG. 2 depicts an exemplary vibration mitigation assembly.

In this regard, FIG. 2 depicts a vibration mitigation assembly 200. Vibration mitigation assembly 200 may include head end coupler 201 and tail end coupler 206, and any suitable number of tuned elastic sections, such as, for example, tuned elastic sections 202, 204, and 205, connected using any suitable number of inter-module connectors 203. The head end coupler 201 and the tail end coupler 206 may allow the vibration mitigation assembly 200 to be coupled to any of the components of an electro-mechanical cable 103, such as the sections 106 with sensor components 104 and the birds 107. For example, the vibration mitigation assembly 200 may be coupled to the tow assembly 102 and to one of the sections 106 along the length of one of the electro-mechanical cables 103 using the head end coupler 201 and the tail end coupler 206. The vibration mitigation assembly 200 may be coupled at any suitable location along the electro-mechanical cable 103. In one application, the vibration mitigation assembly 200 may be coupled between two different sections 106. In another application, the vibration mitigation assembly 200 may be at the end of the electro-mechanical cable 103, and only the head end coupler 201 may be coupled to a preceding section 106. In yet another application, vibration mitigation assembly 200 may be integrally build inside a section 106. In other words, vibration mitigation assembly 200 may exist as an independent module that is configured to be attached anywhere along the length of the electro-mechanical cable 103 or it may be manufactured inside any section 106 of electro-mechanical cable 103. Those skilled in the art would recognize the greater flexibility if the former approach is taken. However, the later approach is not without merits.

The tuned elastic sections 202, 204, and 205 may be made of any suitable material, and in any suitable shape, and may be elastic stretch modules with a complex spring rate selected for a given frequency pass-band. The tuned elastic sections 202, 204, and 205 may each have a complex spring rate due to the use of a spring, damper, visco-elastic material, or other suitable device, material, or combination thereof. Each of the tuned elastic sections in the vibration mitigation assembly, such as the tuned elastic sections 202, 204, and 205 may have different complex spring rates, and may use different combinations of springs, dampers, and visco-elastic materials, or other devices and materials, and may be of different lengths. A specific example of a tuned elastic section is discussed later.

Each of the tuned elastic sections 202, 204, and 205 may be optimized for a predefined frequency bandwidth, which may allow for the tuned elastic section to suppress vibrations within that frequency bandwidth. For example, if the seismic frequency range of interest is 5 to 250 Hz, such a tuned elastic section may be configured to suppress noise only in a reduced frequency range, for example, 5 to 30 Hz. Other frequency ranges may be uses as will be appreciated by those skilled in the art. This may reduce the amount of noise that reaches the sensor components 104. The frequency bandwidth of vibrations suppressed by one of the tuned elastic sections 202, 204, and 205 may be selected based on the intended location of the vibration mitigation assembly 200 along the electro-mechanical cable 103 and within the streamer field 110, and on the number of frequency bandwidths selected for other tuned elastic sections used in the same vibration mitigation assembly 200. For example, if low frequency noise is determined to be generated at the front of the streamer field 110 and high frequency noise is detected to be generated at the rear of the streamer field 110, one or more elastic sections 202, 204, and 205 tuned for low frequency may be frontally deployed while one more elastic sections 202, 204, and 205 tuned for high frequency may be deployed at the end of the streamer field. The frontal and rear positions are exemplary and those skilled in the art would understand that the elastic sections 202, 204, and 205 may be deployed at any location along the electro-mechanical cable, as determined by the operator of the seismic survey. The structure of one of the tuned elastic sections 202, 204, and 205, including length and use of any springs, dampers, visco-elastic, or other materials or devices, may be based on the frequency bandwidth of the vibrations the tuned elastic section is intended to suppress. Note that in one application a single tuned elastic section may be used for an entire section and/or for an entire electro-mechanical cable. More tuned elastic sections may be more advantageous for suppressing a larger frequency range noise.

The tuned elastic sections 202, 204, and 205 of the vibration mitigation assembly 200 may be connected together using the inter-module connectors 203. The boundaries between the tuned elastic sections 202, 204, and 205, and the inter-module connectors 203, the head end coupler 201, and the tail end coupler 206, may be high impedance material interfaces 207. The high impedance material interfaces 207 may use any suitable combination of physical properties, such as density and elasticity, and coupling geometry to create a high impedance mismatch which may inhibit the transmission of energy between the various couplings of the vibration mitigation assembly 200.

The sequential use of the high impedance material interfaces 207 and tuned elastic sections 202, 204, and 205 may result in the vibration mitigation assembly 200 acting as a cascade filter. For example, a first tuned elastic section 202 may be configured to attenuate noise in the frequency range of 5 to 10 Hz, a second tuned elastic section 204 may be configured to attenuate noise in the frequency range of 10 to 15 Hz and a third tuned elastic section 205 may be configured to attenuate noise in the frequency range of 15 to 25 Hz. These ranges are exemplary and not intended to limit the invention. More ranges may be envisioned if more tuned elastic sections are used. The ranges noted above may be narrower or larger or they may overlap. Note that the tuned elastic sections may be distributed one after another at substantially a same location of the electro-mechanical cable or they may be physically separated by one or more streamer sections 106. In one application, the one or more tuned elastic sections may be connected to each other. In still another application, two or more of the tuned elastic sections are isolated by one or more high impedance material interfaces 207 from each other.

The vibration mitigation assembly 200 may thus be tailored to attenuate vibration based on frequency and spatial requirements through the selection of tuned elastic sections, for example, tuned elastic sections 202, 204, and 205, used in the vibration mitigation assembly 200. The vibration mitigation assembly 200 may use sequential impedance optimization, through the impedance of the tuned elastic sections 202, 204, and 205, to attenuate vibrations experienced at a specific section of the electro-mechanical cable 103, at a specific location with the streamer field 110.

Figure 3:
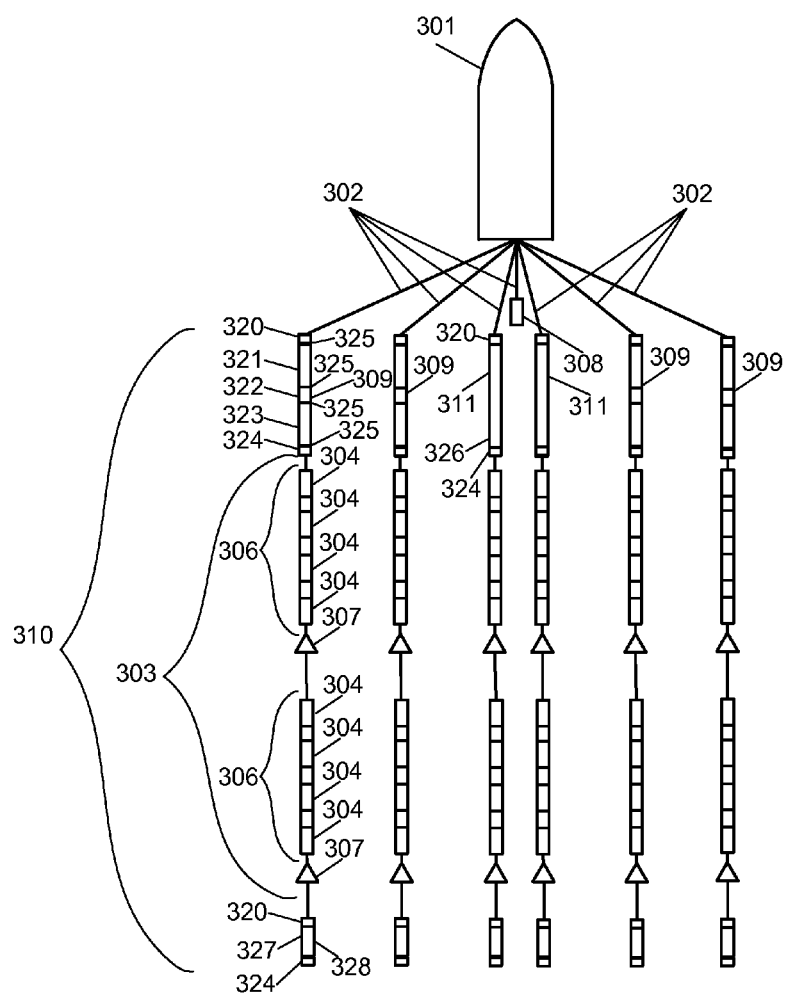
FIG. 3 depicts an exemplary marine-seismic cable system with vibration mitigation assemblies.

FIG. 3 depicts an exemplary marine-seismic cable system with vibration mitigation assemblies. Any number of vibration mitigation assemblies, such as the vibration mitigation assembly 200, may be installed on the electro-mechanical cables 303 of the streamer field 310. For example, vibration mitigation assemblies 309 and 311 may be installed at the head of each electro-mechanical cable 303 in the streamer field 310 in place of the radial vibration isolation modules 109. Additional vibration mitigation assemblies 327 may be installed at the tail of each electro-mechanical cable 303, and further vibration mitigation assemblies may be installed at any suitable location along the electro-mechanical cables 303. In one embodiment, one or more vibration mitigation assembly is installed after each bird. The vibration mitigation assemblies discussed herein may include any number of tuned elastic assemblies. Thus, a single vibration mitigation assembly may be designed to attenuate noise in a narrow frequency range or large frequency range. Therefore, a vibration mitigation assembly may be tuned to attenuate a desired frequency range, as desired by the seismic survey's operator. According to an embodiment, such an assembly is advantageous because it may be tuned depending upon its location along the electro-mechanical cable, the type of sensors carried by the cable, the type of birds used to steer the cable, etc. Thus, the assembly solution disclosed in this embodiment is highly adaptive and flexible depending on the seismic survey.

The vibration mitigation assemblies 309, 311, and 327 may all differ from each other, as each of the vibration mitigation assemblies may be assembled to attenuate the vibrations experienced at its location of installation. For example, the vibration mitigation assembly 309 may be assembled using head end coupler 320, tail end coupler 324, tuned elastic sections 321 and 323, and inter-module connector 322, joined with high impedance material interfaces 325. The tuned elastic sections 321 and 323 may differ, for example, having different lengths or being constructed using different springs, dampers, or visco-elastic materials. The vibration mitigation assembly 311 may be assembled using a head end coupler 320, tailed end coupler 324, and a tuned elastic section 326. The tuned elastic section 326 may differ from the tuned elastic sections 321 and 323, as the tuned elastic section 326 may be constructed to suppress vibrations at frequencies experienced by the electro-mechanical cable 303 closest to the air gun 308. The frequency of those vibrations may be different than the frequency of vibrations experienced by the electro-mechanical cable 303 farther from the air gun 308, resulting in the structure of the vibration mitigation assembly 309 differing from the structure of the vibration mitigation assembly 311. The vibration mitigation assembly 327 may use a tuned elastic section 328, which may differ from, for example, be shorter than, the vibration mitigation assemblies 309 and 311.

Figure 4:
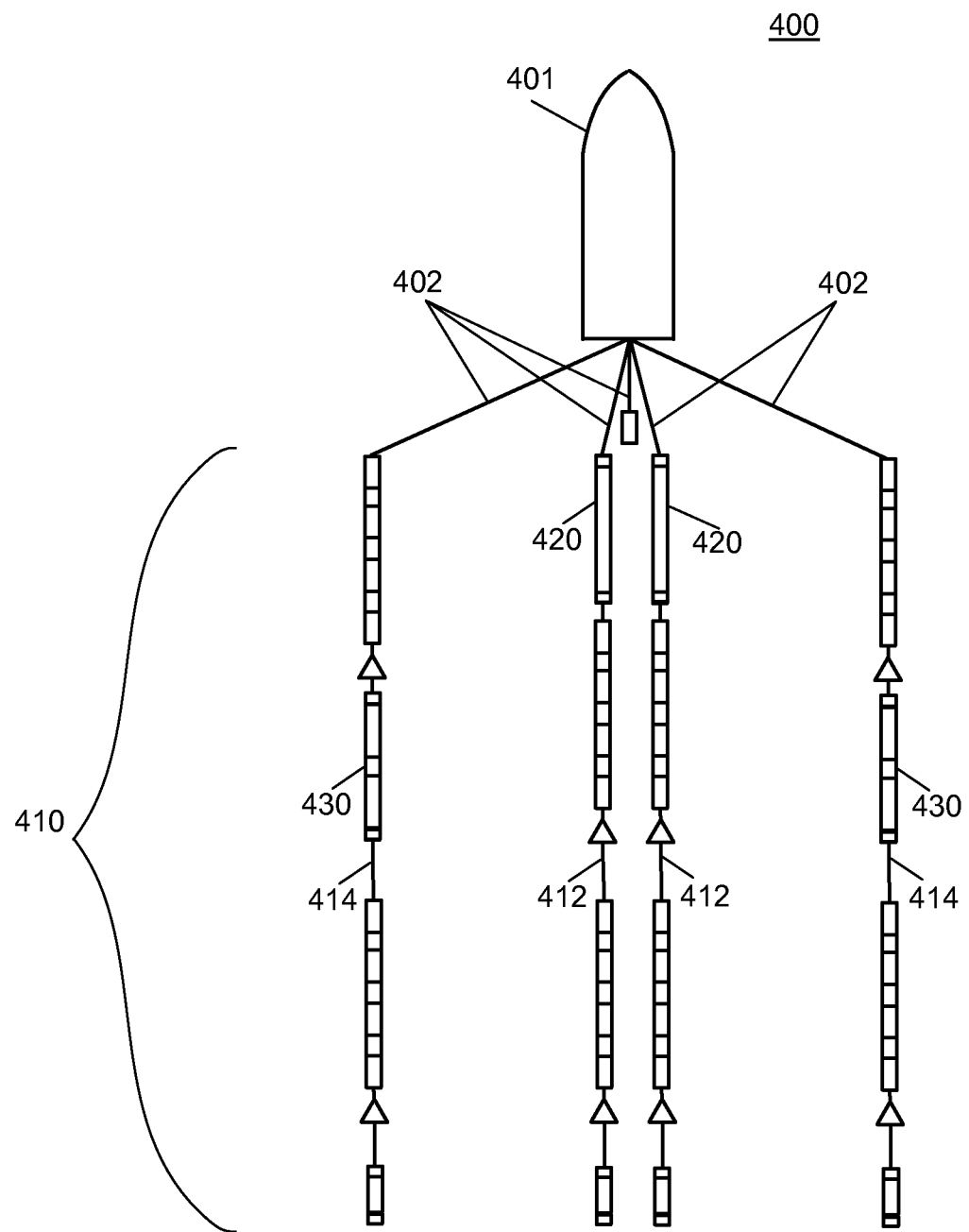
FIG. 4 depicts an exemplary streamer spread that uses vibration mitigation assemblies.

In addition, the vibration mitigation assemblies may be disposed along each electro-mechanical cables in different configurations. More specifically and as illustrated in FIG. 4, a seismic survey system 400 includes a vessel 401 towing a streamer spread 410 that includes central electro-mechanical cables 412 and peripheral electro-mechanical cables 414. One or more central electro-mechanical cables may be fitted with one type of vibration mitigation assemblies 420 while the peripheral electro-mechanical cables 414 may be fitted with another type of vibration mitigation assemblies 430. The term "type of vibration mitigation assembly" may refer to various seismic parameters, for example, the frequency range attenuation. In another embodiment, the first type of vibration mitigation assemblies 420 are distributed at a front part of the seismic spread 410 while the second type of vibration mitigation assembly is distributed after each bird. In still another application, the first type of vibration mitigation assemblies are distributed at the front part of the seismic spread, only on the central cables 412 while the second type of vibration mitigation assembly is distributed after each bird only on the peripheral cables 414. Other combination of the first and second type of vibration mitigation assemblies, other positions of them and other types of assemblies may be conceived on all or part of the cable of the streamer spread 410.

Vibration mitigation assemblies, such as the vibration mitigation assemblies 309, 311, and 327, may be constructed using any suitable combination of tuned elastic sections, such as the tuned elastic sections 321, 323, and 326, joined by inter-module connectors and high-impedance material interfaces. Each vibration mitigation assembly used with electro-mechanical cables in a streamer field, such as the electro-mechanical cables 303 in the streamer field 310, may be constructed based on the frequency of vibrations that the vibration mitigation assembly is intended to suppress. The frequency of the vibrations may be dependent on the intended installation location for the vibration mitigation assembly along the electro-mechanical cable and within the streamer field.

An example of a tuned elastic section 500 is now discussed with regard to FIG. 5. FIG. 5 shows a tuned elastic element 500 that includes include male and female couplings 501 and 502, and a housing 510 that may contain an axial motion suppression section 503 and/or a bending and rotational motion suppression section 508. The male and female couplings 501 and 502 may allow the tuned elastic element 500 to be coupled to any of the components of an electro-mechanical cable 503, such as the sections 506 with sensor components 504 and birds 107. For example, the tuned elastic element 500 may be coupled to one of the birds 107 and to one of the sections 106 along the length of one of the electro-mechanical cables 103 using the male and female couplings 501 and 502. Alternatively, the tuned elastic element 500 may be coupled between two consecutive sections 106. In one application, the tuned elastic element 500 may be coupled between a section 106 and the towing assembly 102 as illustrated in FIG. 1. In still another application, two or more tuned elastic element 500 are connected to each other before being connected to the sections. In yet another application, the tuned elastic element 500 may be built into one or more sections 106 of the streamer, or into a radial vibration isolation module 109.

Housing 510 may be any suitable housing, of any suitable material and any suitable shape for marine use. For example, housing 510 may be a cylindrical polyurethane jacket. Housing 510 may cover the axial motion suppression section 503 and the bending and rotational motion suppression section 508. Housing 510 may be flexible and stretchable, allowing for some motion of the components of the tuned elastic element 500.

The axial motion suppression section 503 may include any suitable equipment for the suppression of axial motion in the tuned elastic element 500. For example, the axial motion suppression section 503 may include disk springs 504, arranged along a rod 505, having a plunger 507, inside of a chamber 506. Note that the number of the disk springs 504 may be varied to tune the axial motion suppression section accordingly. Rod 505 may be attached, or mechanically linked, to the male coupling 501 or the female coupling 502, for example, by being welded or bolted to the male coupling 501 or the female coupling 502, such that motion of the male coupling 501 or the female coupling 502 may be transmitted to 505. Chamber 506 may be attached, or mechanically linked, to male coupling 501 or female coupling 502, whichever is not attached to rod 505, such that motion of male coupling 501 or female coupling 502 may be transmitted to chamber 506. Rod 505 and chamber 506 may be directly attached to male coupling 501 and female coupling 502, or may be indirectly linked to male coupling 501 and female coupling 502, for example, by being attached to a part of tuned elastic element 500 that is in turn attached to male coupling 501 and female coupling. Rod 505 may be inserted into chamber 506, with the shaft of the rod 505 going through an appropriately sized opening in the base of chamber 506. Rod 505 and chamber 506 may be made from any suitable material, and may be in any suitable shape for use within housing 510 of tuned elastic element 500. For example, rod 505 and chamber 206 may be cylindrical Disk springs 504 may be of any suitable size and made of any suitable material, including metals and composites, and may have a deflection curve that is non-linear and digressive. Any number of disk springs 504 may be arranged along the rod 505 in any suitable manner, for example, in a parallel, in series, or any combination thereof. For example, the number and arrangement of disk springs 504 used in the tuned elastic element 500 may depend on the nature, length, diameter, etc. of the electro-mechanical cable 103 to which the tuned elastic element 500 may be attached, and the location of attachment. In other words, the tuned elastic element 500 has a "tuning" capability that may be exploited by the seismic survey's operator to achieve the best damping/attenuation of the noise propagating along the streamer.

The axial motion suppression section 503 may also use dampers to inhibit free vibration along longitudinal axis. The flow path between Belleville sets may be controlled and filled with the appropriate fluid. Select friction materials may be included at sliding points to implement coulomb damping.

The bending and rotational motion suppression section 508 may include any suitable equipment for the suppression of rotational motion and bending in the tuned elastic element 500. For example, the bending and rotational motion suppression section 508 may include a multi-axis flexure 509. The multi-axis flexure 509 may be a 3-axis flexure with low bending stiffness in one direction, a higher bending stiffness in the other two directions, and may support large axial tensile loads. Two or more flexure sets, oriented at a minimum of 90 degrees to each other, may be used in the multi-axis flexure 509. This may allow the multi-axis flexure to suppress bending, or transverse motion, regardless of orientation of the tuned elastic element 500. The multi-axis flexure 509 may also attenuate rotational motion. The multi-axis flexure 509 may be made of any suitable material. The action of the multi-axis flexure 509 may suppress transmission of bending and rotational motion through the cable dynamic isolator 500, for example, attenuating vibrations from bending and rotational motion transmitted from one of the birds 107, reducing the noise experienced by the sensor components 104. The bending and rotational motion suppression section 508 may also use friction pads for coulomb damping and fluid filled bladders or pockets may provide viscous damping.

Tuned elastic element 500 may also include sensors 511. The sensors 511 may be any suitable sensors or instrumentation for monitoring the performance of the tuned elastic element 500. For example, the tuned elastic element 500 may include, within the housing 510, any combination of sensors 511 that may be, for example, accelerometers to measure acceleration, force sensors for the measurement of force, and strain gages for the measurement of strain within the tuned elastic element 500.

FIG. 6 depicts an exemplary portion of a tuned elastic element including a chamber, a rod, and disk springs. The portion of the tuned elastic element 600 used in the axial motion suppression section 503 may include chamber 601, rod 602 with plunger 603, and disk springs 604. The disk springs 604 may be arranged in any suitable manner along the rod 602. For example, several pairs of the disk springs 604 may be arranged along the rod 602, with each pair including two disk springs 604 in series touching at their base. The rod 602 may be inserted into the camber 601, such that the disk springs 604 may be compressed between the bottom of the chamber 601 and the plunger 603 based on motion of either the chamber 601 or the rod 602.

FIG. 7 depicts an exemplary multi-axis flexure. Note that a single axis flexure may be used. A multi-axis flexure 700 may be, for example, a beam-type flexure, and may include flexure sets 701 and 702. The flexure sets 701 and 702 may be oriented at a minimum of a 90 degree angle with respect to each other, and may in combination absorb rotational motion and bending. The multi-axis flexure 700 may include any number of flexure sets oriented similarly to the flexure sets 701 and 702.

Figure 8:
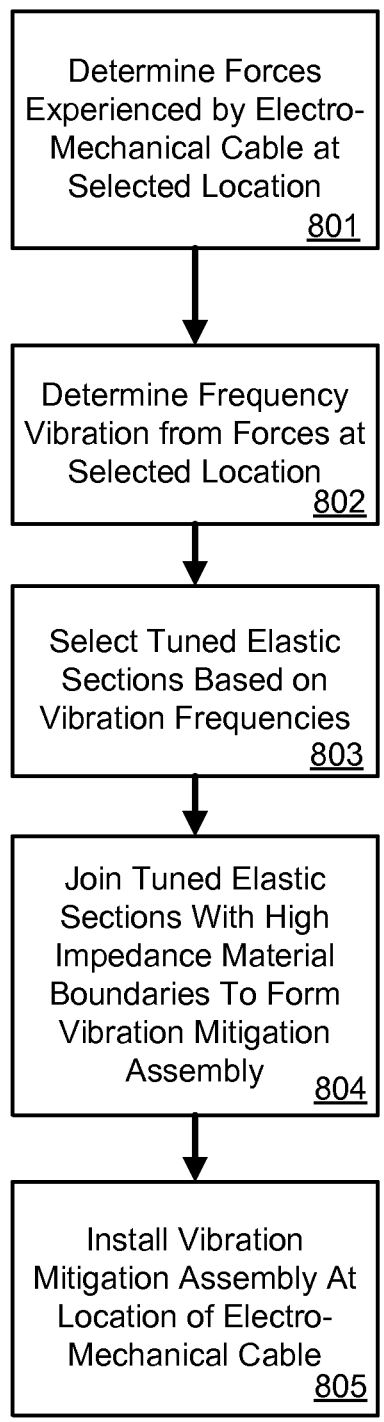
FIG. 8 depicts an exemplary procedure for preparing a vibration mitigation assembly with sequential impedance optimization.

FIG. 8 depicts an exemplary procedure for preparing a vibration mitigation assembly with sequential impedance optimization. In block 801, forces experienced by an electro-mechanical cable may be determined at selected locations. For example, the electro-mechanical cable 103 may be tested at sea, while being towed behind the marine vessel 101. Vector sensors, such as accelerometers, may be used in the electro-mechanical cable 103 to determine the properties of axial, rotational, transverse, and bending forces experienced at selected locations along the electro-mechanical cable 103, in a selected part of the streamer field 110. The forces may also be determined in an any other suitable manner, including simulations, estimations, or application of engineering and physics principles to the known properties of the electro-mechanical cable 103, marine vessel 101, towing assembly 102, and the water.

In block 802, vibration frequencies may be determined (measured or calculated) from the forces determined in block 801. For example, the frequencies of the vibrations experienced by the electro-mechanical cable 103 at the selected locations may be determined based on the forces experienced the electro-mechanical cable 103 at the selected locations. The vibrations may be the noise experienced by the electro-mechanical cable 103 during use which may interfere with the signal being picked up by the sensor components 104 during a seismic survey. The vibration mitigation assemblies intended for installation at the selected locations may need to suppress or attenuate the vibrations at the determined frequencies experienced by the electro-mechanical cable 103.

In block 803, tuned elastic sections may be selected based on the determined vibration frequencies in block 802. For example, the tuned elastic sections, such as the tuned elastic sections 202, 204, and 205, may be selected and arranged based on the frequency of vibrations to be suppressed by the vibration mitigation assembly, for example, the vibration mitigation assembly 200, in order to attenuate vibrations experienced by the electro-mechanical cable 103. Any number of the tuned elastic sections may be selected for a given vibration mitigation assembly, and they may have varying lengths and constructions, including use of differing combinations of springs, dampers, and visco-elastic material. Note that the tuned elastic elements discussed above with regard to FIGS. 4-7 are only exemplary and other tuned elastic elements may be used. In one application, traditional vibration attenuation modules, which are not tunable, may be mixed up with one or more tuned elastic elements to produce a vibration mitigation assembly. The tuned elastic sections may be selected to create a cascade filter for the determined vibration frequencies.

In block 804, the tuned elastic sections and/or non-tuned elements (e.g., traditional vibration attenuation modules) may be joined with high impedance material boundaries to form a vibration mitigation assembly. For example, the tuned elastic sections 202, 204, and 205, may be joined together using inter-module connectors 203 between each of the tuned elastic sections 202, 204, and 205 to form the vibration mitigation assembly 200. The coupling between each of the tuned elastic sections 202, 204, and 205, and the inter-module connectors 203 may be a high impedance material interface 207. A head end coupler 201 and a tail end coupler 206 may also be joined to the vibration mitigation assembly 200, for example, at the front and back of the vibration mitigation assembly, using high impedance material interface 207. The tuned elastic sections may be arranged in the vibration mitigation assembly according to sequential impedance optimization to create a cascade filter that may allow the vibration mitigation assembly to attenuate vibrations at the determined frequencies at the intended installation location along an electro-mechanical cable, such as the electro-mechanical cable 103, and within a streamer field, such as the streamer field 110.

Thus, according to an embodiment, a vibration mitigation assembly may be adjusted to have more tuned elastic sections joined by more or less inter-module connectors depending on the type of streamer, the forces exerted on the streamer, and the location of the vibration mitigation assembly along the streamer. In other words, a vibration mitigation assembly may be dynamically configured for a future job in a streamer. This provides great flexibility in fitting any existing streamer with the appropriate noise suppression device, at any desired location along the streamer.

At block 805, a vibration mitigation assembly may be installed in an electro-mechanical cable. For example, the vibration mitigation assembly 309 may be installed at the head of the electro-mechanical cable 303 farthest from the air gun 308. The vibration mitigation assembly may be installed at the selected location in the electro-mechanical cable 103 and the streamer field 110 at which the forces were measured, as the vibration mitigation assembly may be constructed specifically to attenuate vibrations caused by the forces measured at that selected location. Note that more than one vibration mitigation assembly may be installed along a single cable. In one embodiment, a mixture of vibration mitigation assemblies is installed along a single cable. In another embodiment, the mixture of vibration mitigation assemblies is installed along the streamer field, with some or all cables having different assembly configurations. The type and position of the vibration mitigation assembly used for each cable is predetermined based on the above noted calculations, which take into account the type of seismic survey and its characteristics.

The disclosed embodiments provide an apparatus and method for cable vibration mitigation through sequential impedance optimization. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An apparatus for vibration mitigation comprising:
one or more tuned elastic sections having a complex spring rate and adapted to attenuate vibrations in a specified frequency range;
one other tuned elastic section;
an inter-module connector, wherein the one other tuned elastic section is coupled to a first end of the inter-module connector, and one of the one or more tuned elastic sections is coupled to a second end of the inter-module connector; and
a head end coupler adapted to couple the apparatus for vibration mitigation to a component of an electro-mechanical cable or a tow assembly, wherein the one of the one or more tuned elastic sections is coupled to the head end coupler with a first impedance interface,
wherein the first impedance interface creates an impedance mismatch between (1) the one of the one or more tuned elastic sections and (2) the head end coupler to inhibit transmission of energy.

2. The apparatus of claim 1, wherein the one other tuned elastic sections is coupled to the first end of the inter-module connector with a second impedance interface, and wherein the one of the one or more tuned elastic sections is coupled to the second end of the inter-module connector with a third impedance interface.

3. The apparatus of claim 1, wherein the one other tuned elastic section is adapted to attenuate vibrations in a specified frequency range that is different from the specified frequency range for one of the one or more tuned elastic sections.

4. The apparatus of claim 1, wherein one of the one or more tuned elastic sections comprises one or more of a spring and a damper.

5. The apparatus of claim 1, wherein one of the one or more tuned elastic sections comprises a visco-elastic material.

6. The apparatus of claim 1, wherein the one of the one or more tuned elastic sections has a different length than the one other tuned elastic section.

7. The apparatus of claim 1, further comprising a tail end coupler adapted to couple the apparatus for vibration mitigation to a component of an electro-mechanical cable.

8. The apparatus of claim 1, wherein the specified frequency range in which the apparatus for vibration mitigation attenuates vibrations is based on the forces experienced by a selected location on the electro-mechanical cable within a streamer field.

9. The apparatus of claim 1, wherein the one or more tuned elastic sections are arranged to form a cascade filter.

10. The apparatus of claim 1, wherein the first impedance interface is adapted to create the impedance mismatch by using one or more of physical properties comprising density and elasticity and variations in coupling geometry.

11. A streamer spread for conducting a seismic survey comprising:
a section comprising at least one sensor component for collecting seismic data; and
a vibration mitigation assembly adapted to attenuate vibrations experienced by the section, wherein the vibration mitigation assembly is coupled to the section,
wherein the vibration mitigation assembly is positioned next to the section based on calculations performed prior to collecting the seismic data, and
wherein the vibration mitigation assembly includes,
at least one tuned elastic section,
at least one other tuned elastic section, and
at least one impedance interface between the at least one tuned elastic section and the at least one other tuned elastic section, wherein the at least one impedance interface, the at least one tuned elastic section, and the at least one other tuned elastic section are arranged to form a cascade filter, and wherein the at least one impedance interface creates an impedance mismatch between (1) the at least one tuned elastic section and (2) the at least one other tuned elastic section to inhibit transmission of energy.

12. The streamer spread of claim 11, wherein the vibration mitigation assembly is coupled to one of a front end and a back end of the section using one of a head end coupler and a tail end coupler.

13. The streamer spread of claim 11, further comprising:
one or more additional sections; and
one or more additional vibration mitigation assemblies, wherein each of the one or more additional vibration mitigation assemblies is coupled to at least one of the one or more additional sections.

14. The streamer spread of claim 11, further comprising:
first and second streamers for collecting the seismic data, the first streamer including the section and the vibration mitigation assembly, the second streamer having another vibration mitigation assembly located at a different position than the vibration mitigation assembly of the first streamer.

15. A method for preparing a vibration mitigation assembly comprising:

determining forces experienced at a selected location of an electro-mechanical cable;

determining frequencies for vibrations caused by the forces at the selected location of the electro-mechanical cable;

selecting first and second tuned elastic sections based on the determined frequencies;

joining the first and second selected tuned elastic sections using at least one impedance interface to form a vibration mitigation assembly; and placing the vibration mitigation assembly at the selected location along the electro-mechanical cable, wherein the at least one impedance interface creates an impedance mismatch between (1) the first selected tuned elastic section and (2) the second selected tuned elastic section.

16. The method of claim 15, wherein joining the first and second selected tuned elastic sections further comprises joining the first and second selected tuned elastic sections using an inter-module connector.

17. The method of claim 15, further comprising:

installing another vibration mitigation assembly at other selected location on the electro-mechanical cable, wherein the another plural vibration mitigation assembly is different from the vibration mitigation assembly.

18. The method of claim 15, wherein the first and second tuned elastic sections are selected to attenuate at least a portion of the vibrations caused by the forces at the selected location of the electro-mechanical cable to reduce the noise experienced by a sensor component of the electro-mechanical cable.

19. The method of claim 15, further comprising:

determining forces experienced at a second selected location of the electro-mechanical cable;

determining frequencies for vibrations caused by the forces at the second selected location of the electro-mechanical cable;

selecting third and fourth tuned elastic sections based on the determined frequencies for the second selected location;

joining the third and fourth tuned elastic sections using at least another impedance interface to form a second vibration mitigation assembly; and installing the second vibration mitigation assembly at the second selection location on the electro-mechanical cable.

* * * * *